United States Patent
Harvey et al.

(10) Patent No.: US 10,649,316 B2
(45) Date of Patent: May 12, 2020

(54) AQUATIC VISUAL DATA COLLECTOR

(71) Applicant: OCEAN VISION ENVIRONMENTAL RESEARCH PTY LTD, Dianella, Western Australia (AU)

(72) Inventors: Matthew Harvey, Dianella (AU); Nicholas Dobson, Dianella (AU)

(73) Assignee: OCEAN VISION ENVIRONMENTAL RESEARCH PTY LTD, Dianella, Western Australia (AU)

( * ) Notice: Subject to any disclaimer, the term of this patent is extended or adjusted under 35 U.S.C. 154(b) by 0 days.

(21) Appl. No.: 15/557,110

(22) PCT Filed: Mar. 11, 2016

(86) PCT No.: PCT/AU2016/050175
§ 371 (c)(1),
(2) Date: Sep. 10, 2017

(87) PCT Pub. No.: WO2016/141440
PCT Pub. Date: Sep. 15, 2016

(65) Prior Publication Data
US 2018/0046065 A1    Feb. 15, 2018

(30) Foreign Application Priority Data
Mar. 11, 2015  (AU) ................................ 2015900875

(51) Int. Cl.
*G03B 17/08* (2006.01)
*B63C 11/48* (2006.01)
(Continued)

(52) U.S. Cl.
CPC .............. *G03B 17/08* (2013.01); *B63C 11/48* (2013.01); *G01C 13/00* (2013.01); *H04N 7/185* (2013.01);
(Continued)

(58) Field of Classification Search
USPC ........................................................ 348/81
See application file for complete search history.

(56) References Cited

U.S. PATENT DOCUMENTS 6,836,285 B1 * 12/2004 Lubard ................. G01S 7/4802
  348/31
8,300,499 B2 * 10/2012 Coleman ................ G01S 15/87
  367/88
(Continued)

FOREIGN PATENT DOCUMENTS

CN    202717021    2/2013
CN    204021230    12/2014
(Continued)

OTHER PUBLICATIONS

International Search Report for PCT/AU2016/050175, Completed by the Australian Patent Office dated Jun. 8, 2016, 4 Pages.
(Continued)

*Primary Examiner* — Chikaodili E Anyikire
(74) *Attorney, Agent, or Firm* — Brooks Kushman P.C.

(57) ABSTRACT

A system for the collection of visual and related data on marine and other underwater habitats and fauna, in particular and without limitation for benthic habitats over significant spatial scales. The system can include elements such as a digital or video camera to receive visual images, various sensors to sense other related data and waterproof housings to protect various elements of the device. A sensor may for
(Continued)

example be a global positioning system. The device can also include elements to control the device and to record, transfer & process the data.

11 Claims, 6 Drawing Sheets

(51) Int. Cl.
*G01C 13/00* (2006.01)
*H04N 7/18* (2006.01)
*H04N 5/232* (2006.01)

(52) U.S. Cl.
CPC ....... *B63B 2211/02* (2013.01); *G03B 2206/00* (2013.01); *H04N 5/23203* (2013.01); *H04N 5/23293* (2013.01)

(56) References Cited

U.S. PATENT DOCUMENTS

| | | | | |
|---|---|---|---|---|
| 8,437,630 | B2* | 5/2013 | Wessner | A01K 91/06 396/25 |
| 2007/0242134 | A1* | 10/2007 | Zemov | H04N 5/2252 348/81 |
| 2010/0005857 | A1* | 1/2010 | Zhang | B63C 11/48 73/29.02 |
| 2010/0235018 | A1* | 9/2010 | Christ | G01N 21/952 701/2 |
| 2011/0202278 | A1* | 8/2011 | Caute | G01S 7/003 702/14 |
| 2011/0205536 | A1* | 8/2011 | Johnsen | G01J 3/06 356/326 |
| 2012/0210926 | A1* | 8/2012 | Storm, Jr. | B63C 11/26 114/337 |
| 2013/0219769 | A1* | 8/2013 | Hey | A01K 69/06 43/4.5 |
| 2014/0212142 | A1 | 7/2014 | Doniec et al. | |
| 2015/0192488 | A1* | 7/2015 | Xu | B63C 11/40 702/38 |
| 2016/0119065 | A1* | 4/2016 | Tobias | G03B 17/08 348/81 |

FOREIGN PATENT DOCUMENTS

| | | |
|---|---|---|
| EP | 2757710 A1 | 7/2014 |
| JP | 2004260757 | 9/2004 |
| JP | 2007242305 A | 9/2007 |
| JP | 4221510 B1 | 2/2009 |
| JP | 2012220859 A | 11/2012 |
| WO | 2012129612 | 10/2012 |
| WO | 2014182880 | 11/2014 |

OTHER PUBLICATIONS

Lecours et al., "Spatial Scale and Geographic Context in Benthic Habitat Mapping" Marine Ecology Progress Series, vol. 535, pp. 259-284.

Ellis, Schneider, "Spatial Scalingin Benthic Ecology" Journal of Experimental Marine Biology and Ecology vol. 366, pp. 92 98.

Riegl et al., "Mapping and Monitoring of Coral Communities and Their Spatial Patterns Using a Surface-Based Video Method From a Vessel", Bulletin of Marine Science, vol. 69, No. 2, 2001, pp. 869-880.

Kevin, Tobias et al., Smart Underwater Real-Time Wi-Fi Camera System, U.S. Appl. No. 62/068,619, filed Oct. 24, 2014, 10 pages.

* cited by examiner

AQUATIC VISUAL DATA COLLECTOR

CROSS-REFERENCE TO RELATED APPLICATION

This application is the U.S. national phase of PCT Application No. PCT/AU2016/050175 filed on Mar. 11, 2016, which claims priority to AU Patent Application No. 2015900875 filed on Mar. 11, 2015, the disclosures of which are incorporated in their entirety by reference herein.

FIELD

The invention relates to a system for the collection of data on marine and other underwater habitats and fauna, in particular and without limitation, for benthic habitats over significant spatial scales.

BACKGROUND

Benthic habitats in marine environments, particularly in coastal areas, are increasingly being subjected to anthropogenic impacts. However, their vast spatial coverage and inaccessibility often make biodiversity assessment difficult for accurate monitoring and management. Although remote sampling systems are currently being used for monitoring by specialist service providers, there are no commercially available systems that allow for convenient and cost effective use by a broader scientific community and which incorporate an adequate level of spatial accuracy, capability to record large volumes of data quantitatively, functionality to 'plug-and-play' a wide range of scientific data sensors and adaptability to a wide range of scientific uses.

SUMMARY

A system in accordance with the present invention has been devised to provide scientific data collection in a convenient, systematic, statistically valid and cost-effective manner (for example, allowing the use of a standard personal computer, a wide range of the latest consumer market digital camera technology (including without limitation a digital single lens reflex camera, an digital mirrorless camera, a digital action camera, a digital video camera, etc.— referred to collectively as a 'camera') to capture digital visual images of the habitat (referred to as 'visual images'), synchronised with a wide range of sensors detecting other environmental parameters correlated in time & location and utilising a readily available 'plug-and-play' network interface extension circuitry module) for a wide range of marine & other aquatic research, environmental monitoring and other purposes.

The scope of such research and monitoring programmes may range very significantly up to as large a study area as, for example, Ningaloo Marine Park in Western Australia having an area of approximately 263,343 hectares. A system in accordance with the present invention has been devised to support environmental research and monitoring of benthic environments over study areas up to this order of magnitude ('significant spatial scale').

In accordance with a first aspect of the invention there is provided a system for monitoring a benthic habitat comprising a manned boat, an underwater camera assembly, one or more sensors mounted on the camera assembly, a deck unit operatively connected to the camera assembly and one or more sensors to enable communication with and control of the camera and sensors by an operator on the boat to facilitate the simultaneous capture of a sequence of operator-selected visual images and correlated sensor data wherein successive images in a sequence are of spatially separate locations within a habitat; and a processor for processing the images and sensor data to provide statistically valid qualitative and quantitative assessment of the benthic habitat on a significant spatial scale.

In accordance with a second aspect of the invention there is provided a method for monitoring a benthic habitat comprising deploying from a manned boat an underwater camera assembly and one or more sensors mounted on the camera assembly; operatively connecting a deck unit to the camera assembly and one or more sensors to enable communication with and control of the camera and sensors and enabling an operator on the boat to operate the deck unit to facilitate the simultaneous capture of a sequence of operator-selected visual images and correlated sensor data wherein successive images in a sequence are of spatially separate locations within a habitat; and processing the images and sensor data to provide statistically valid qualitative and quantitative assessment of the benthic habitat on a significant spatial scale.

In one embodiment the system may comprise a pressure-rated waterproof casing (referred to as 'waterproof casing' or 'casing') in several parts devised to incorporate a clear optical dome for underwater photography, latches to secure the casing parts together and internal fitments devised to accommodate & externally control the operation of a camera, as well as the recording and (in some cases) transmission of data collected. The casing incorporates O-ring sealing arrangements between its body & cover and between the cover & the optical dome, accommodates various input/output ports and makes provision for various internal and external sensors & attachments. All these elements are devised, by means of configuration, materials of construction and use of O-rings, to protect the camera & other internal elements and achieve a waterproof rating for the assembled device.

Embodiments of the system may also comprise various elements which may include without limitation elements (any of which may be referred to as a 'sensor') relating to global positioning, compass, physical orientation, water depth, height above bottom, temperature, date/time, dissolved oxygen, pH & photosynthetically active radiation (or PAR), and may include capability to detect & record such parameters (referred to as 'sensor data') in a manner which is synchronised and correlated with the visual images collected & recorded by the camera and subsequently processed, thus facilitating cost effective and fit-for-purpose reliability, accuracy and repeatability in data collection and analysis.

Embodiments of the system may include elements and configuration internal to the casing devised to house, physically secure & connect the camera, together with additional batteries, additional SD or other digital memory card(s) and various associated electronic componentry to facilitate the operation of the device, which may include one or more interconnected, underwater powered interface hubs utilising a readily available 'plug-and-play' network interface extension circuitry module.

Embodiments of the system may include one or more further powered interface hubs on board the boat, a host personal computer with a software processor to monitor and control the system, to display the visual images and sensor data, to process the images and sensor data and to record all relevant information (the foregoing referred to as a 'deck unit') and one or more sensors mounted on the boat (including without limitation global positioning system ('GPS'), depth sounder, compass/tilt sensor).

Embodiments of the system may include a connecting cable (referred to as an 'umbilical') between a network interface extension circuitry module on board the boat and a network interface extension circuitry module forming part of the camera assembly at depths of up to 300 metres below the boat.

Embodiments of the system may include other elements including without limitation anti-flotation weights, lighting and other accessories, fitted internally in the casing or secured externally to the casing or its frame assembly (as applicable and as described below).

A first embodiment of the disclosed system as illustrated in the drawings is constructed to operate underwater attached to both a robust umbilical (and may also incorporate a separate load-bearing cable) lowered from a stationary or slowly moving boat and operated remotely from a deck unit on board that boat (being referred to colloquially as a 'Drop Camera'). However, other embodiments of the system are possible including without limitation as a towed camera suspended from a moving boat with similar cabling, deck unit, etc. (referred to as a 'Towed Camera'), as an operator handheld waterproof dive camera ('Dive Camera'), as a stationary underwater camera mounted on a suitable underwater structure; for example, to monitor aquatic fauna ('Stationary Camera') or as a powered interface hub ('Static Sensor Hub') for a wide range of static sensors in conjunction with or without the camera.

The Drop Camera embodiment as illustrated in the relevant drawings is devised with the casing mounted in a frame assembly comprising proprietary longitudinal frame members, frame end connectors, a primary mounting bracket engaged within longitudinal slots in the frame members, secured to the casing body (thereby allowing the assembled casing and dome to slide longitudinally within the frame), secondary mounting points for other sensors & attachments and incorporating shackles for attachment to the umbilical &/or load-bearing cable; the waterproof casing and frame assembly together being referred to as 'camera assembly'.

Alternatively, embodiments of the system may be constructed to incorporate and operate with a Towed Camera, as outlined in above, with a different form of frame assembly (allowing the casing to be suspended at an inclination to the load-bearing cable, and incorporating fins devised to stabilise the movement of the assembly through the water), including secondary mounting points for other sensors & attachments and optionally incorporating a cost effective system of sensors to estimate the relative position of camera & boat or alternatively incorporating a proprietary sonar positioning system for that purpose.

Alternatively, embodiments of the system may be constructed to incorporate and operate with the Stationary Camera mounted on a suitable underwater structure, as outlined above, with camera, robust mounting arrangements, tamper protection and other features.

The Drop Camera embodiment as illustrated in the drawings (as well as other similar embodiments, including without limitation the Towed Camera and the Static Sensor Hub) is devised such that the camera function and/or data collection as applicable may be remotely controlled (for example, from the deck of the boat) using elements based on the novel application of a readily available 'plug-and-play' network interface extension circuitry module to enable effective operation over considerable distances of separation between the various elements.

The Drop Camera embodiment as illustrated in the drawings is constructed to incorporate a digital single lens reflex camera, but the invention may alternatively be constructed incorporating an alternative camera, such as a digital video camera, instead, including encoding, transmission and decoding of certain data to enable the correlation of the video image stream with relevant sensor data.

The casing is preferably manufactured from aluminium alloy, but could also be constructed from a range of metallic or other materials with sufficient strength and modulus of elasticity to support the casing integrity, including without limitation stainless steel or titanium.

The casing (incorporating a proprietary dome in the present embodiments) is waterproof and pressure-rated for use in shallow near-coastal marine environments or other shallow aquatic environments (of water depths up to 60 metres), but may alternatively be constructed for use in deeper aquatic environments.

In the light of the description of the invention provided, it will be apparent to those skilled in the relevant art that various modifications and variations may be made without departing from the basic inventive concepts.

BRIEF DESCRIPTION OF THE DRAWINGS

Embodiments of the invention (which are illustrative and are not meant to be restrictive of the scope of the invention) will now be described below with reference to the following drawings in which.

DESCRIPTION OF THE PREFERRED EMBODIMENT

Figure 1:
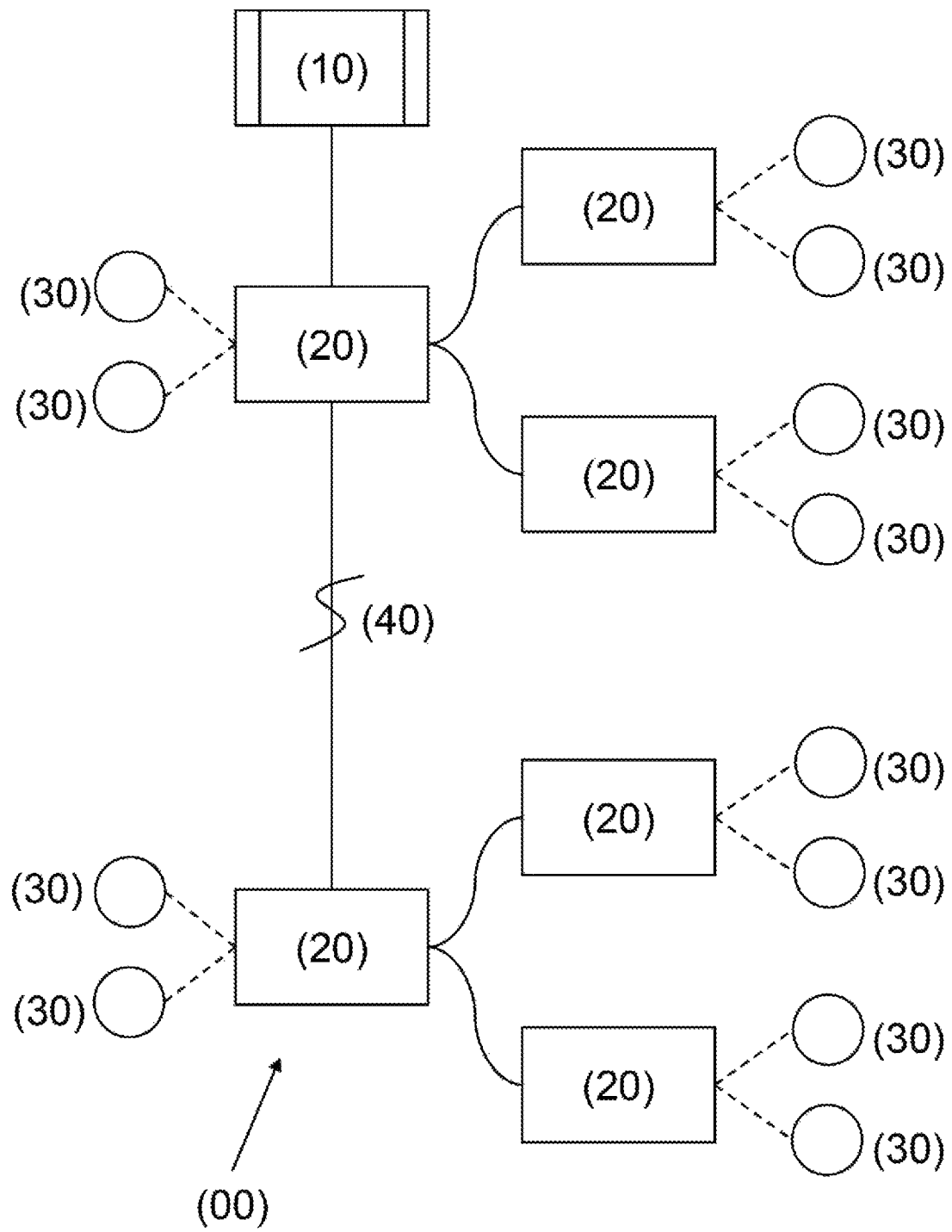
FIG. 1 is a generic schematic block diagram representation of a system in accordance with an embodiment of the present invention.

Referring specifically to FIG. 1, a system in accordance with an embodiment of the present invention comprises a number of interconnected elements; that is, hubs 20 and sensors 30, connected to a host computer 10 (which may be a standard desktop or portable computer). These interconnected elements form a network 00 which has the following characteristics:

- all such sensors 30 have communications and logic connection to the host computer 10 via the network 00 in such a manner to be equivalent to a direct attachment of the sensor to the host computer 10;
- sensors 30 are connected to the network 00 by attaching them directly or indirectly to any hub 20 attached to the network 00;
- as illustrated, the network 00 is extensible in that, within reasonable practical limits, hubs 20 may be interconnected, or chained, by attaching a hub 20 to another hub 20 within the network 00;

attachments between the host computer 10, hubs 20 and sensors 30 (and hubs 20 to other hubs 20) otherwise operate only over relatively short connection distances, but the attachment of one hub 20 to another hub 20 in the present invention may utilise network extension arrangement 40 (a network interface extension circuitry module together with connecting cable, or umbilical, with a sufficient number of conductors and suitable electrical characteristics) to extend the connection distance up to hundreds of metres between relevant hubs 20 thereby enabling embodiments of the system to function with the camera at the required depths of water;

the manner in which sensors 30 are attached to hubs 20, and thus the whole network 00, enables the host computer 10 to detect in real time sensors 30 attached to any part of the network 00 in order to provide "plug-and-play" operation & configuration of the sensors 30; and the manner in which sensors 30 are attached to hubs 20 enables the host computer 10 to exchange data and to provide ongoing remote management via the network 00, including power management, re-configuration and other related management operations.

While FIG. 1 shows two sensors 30 connected to a hub 20, in fact each hub 20 may attach multiple sensors 30, within reasonable limits.

While FIG. 1 shows several hubs 20 chained sequentially together, this chaining may be repeated to further extend the network 00, within reasonable limits.

Figure 2:
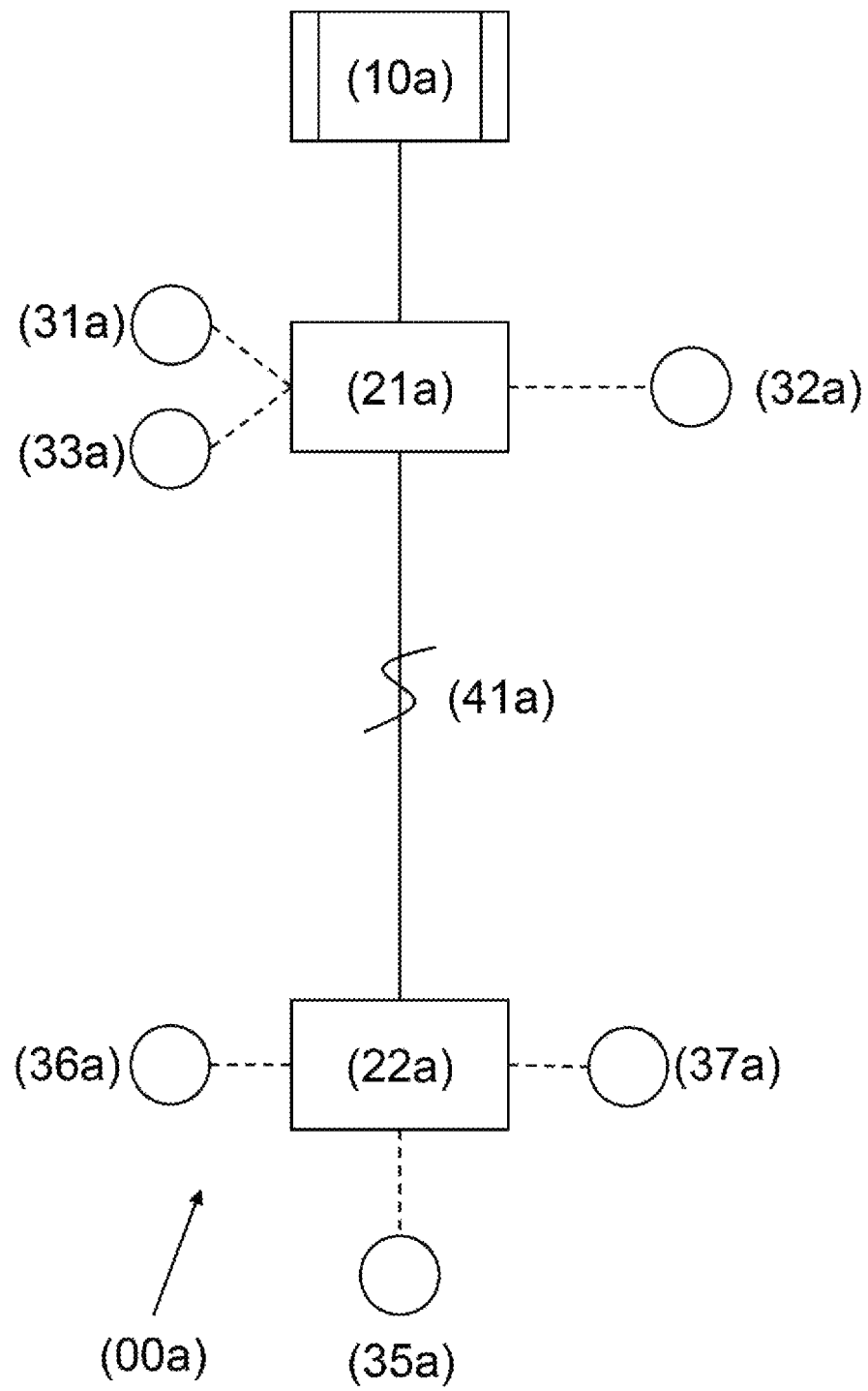
FIG. 2 is a schematic block diagram representation of a first embodiment of the present invention incorporating a Drop Camera as previously described.
Figure 4:
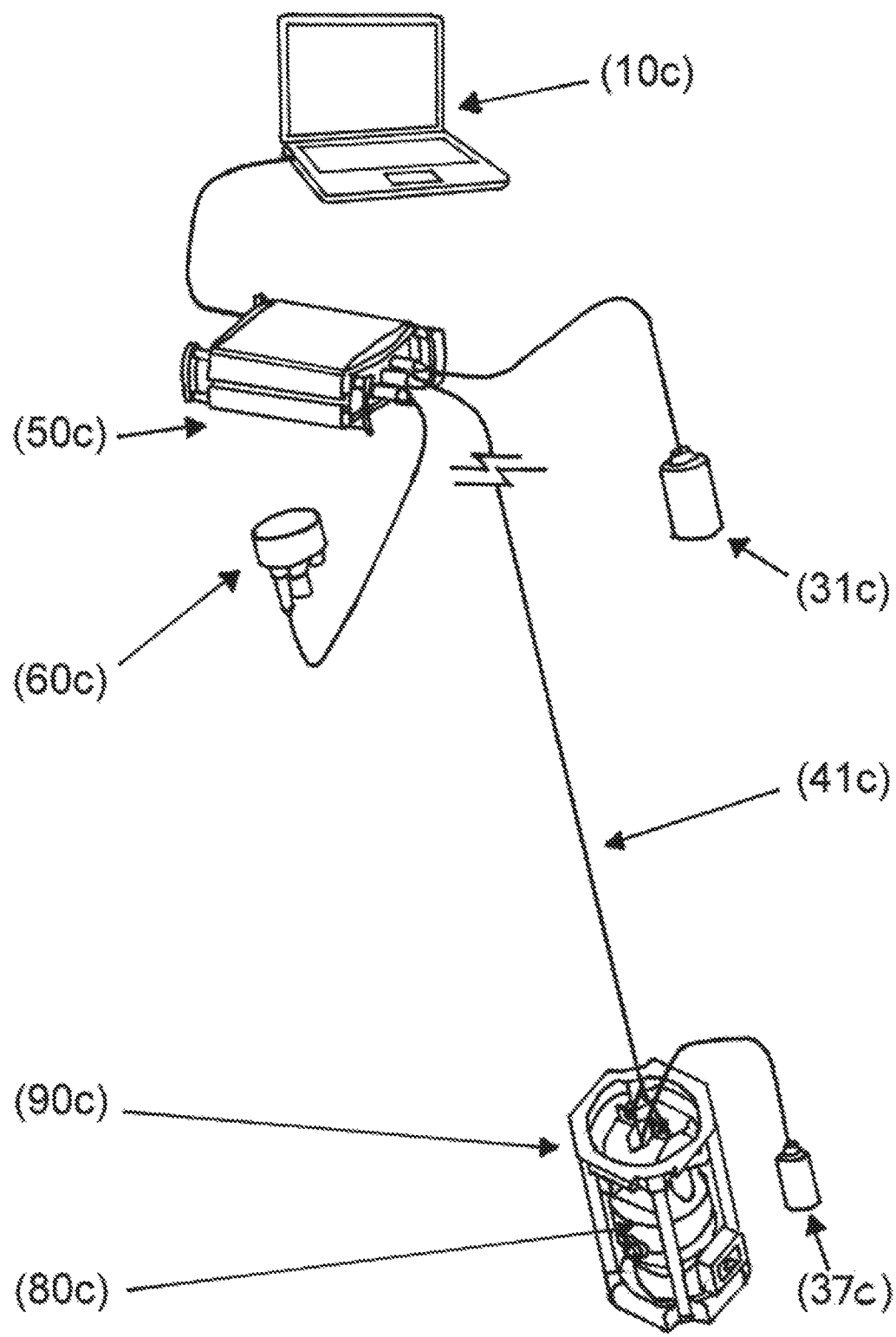
FIG. 4 is a semi-schematic diagram of the Drop Camera that may be used in embodiments of the system.
Figure 5:
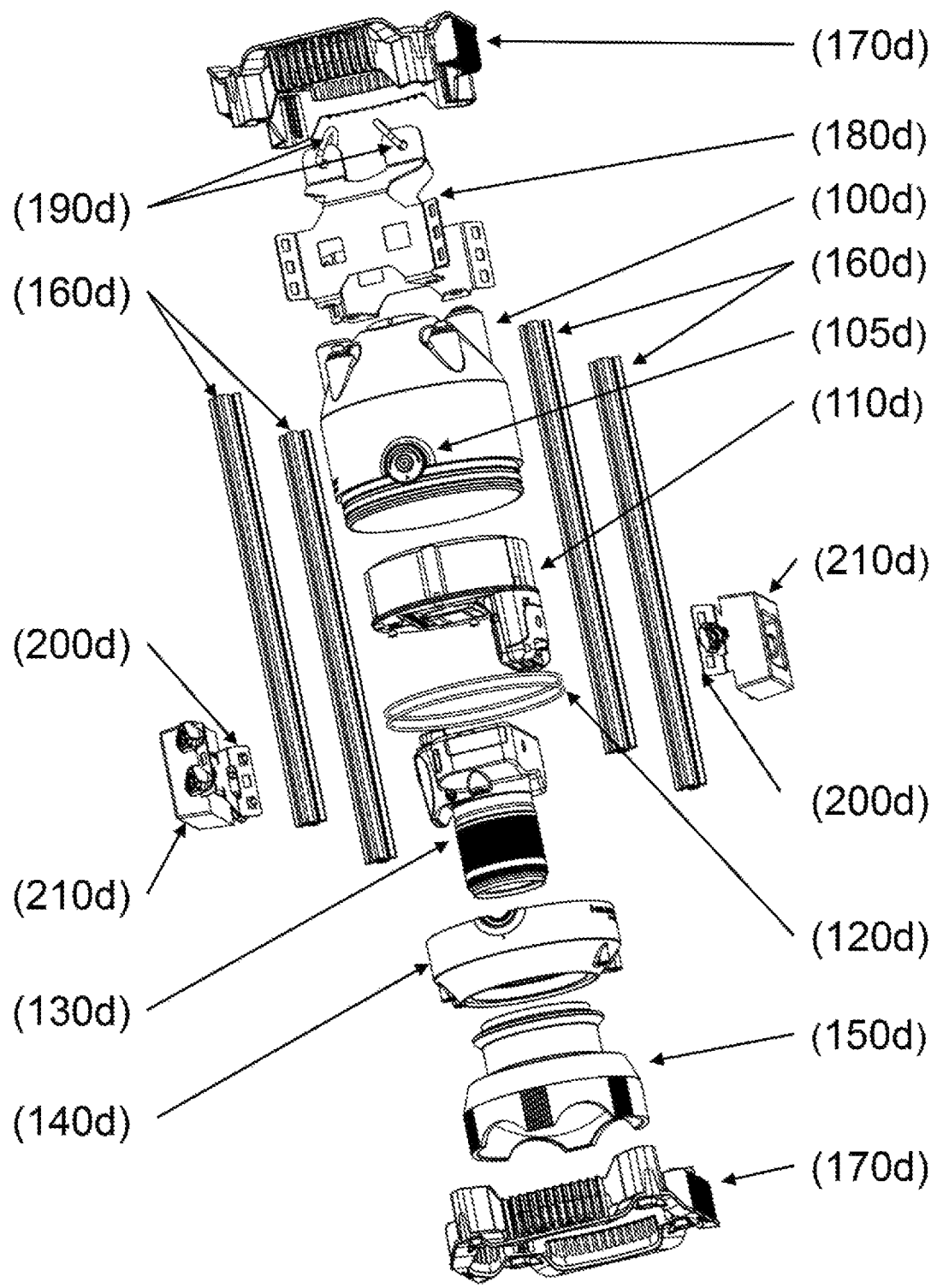
FIG. 5 is a so-called 'exploded' view of the Drop Camera and its frame.

Referring now to FIG. 2, a first embodiment of the present invention, that is, a system which incorporates a Drop Camera typically for use on a stationary or slowly moving boat deployed in relevant aquatic environments, similarly comprises a number of interconnected elements; that is, on-board powered hub 21a, underwater powered hub 22a and various sensors 31a, 32a, 33a, 35a, 36a & 37a, connected to a host computer 10a (which may be a standard desktop or portable computer), on-board powered hub 21a and host computer 10a together being referred to as deck unit. These interconnected elements in FIG. 2 form a network 00a which has characteristics similar & equivalent to those described in relation to FIG. 1, and which is able to communicate required control signals and synchronised visual data & sensor data from the following sensors to the host computer 10a:

Depth sounder 31a is an optional sensor mounted to the boat which senses the depth of the water column from its position just under the water surface to the bottom of the water body under the boat;

GPS 32a mounted to the boat senses the customary global positioning parameters including without limitation absolute position of the boat, date and time;

On-board compass/tilt sensor 33a mounted to the boat senses the bearing of the boat and the attitude (or tilt) of the boat in the water;

Camera 35a mounted within the waterproof casing (described as casing 80c in FIG. 4) senses visual images of the aquatic environment of interest received through an optically clear dome (described as dome 150d in FIG. 5);

Image compass/tilt sensor 36a mounted on the frame assembly (described as frame assembly 90c in FIG. 4) senses the bearing and the attitude (or tilt) of the camera 35a; and Image altimeter 37a mounted on the frame assembly (described as frame assembly 90c in FIG. 4) senses the depth of the water column above the camera 35a and the height of the water column to the bottom of the water body below the camera 35a.

Referring again to FIG. 2, the operation of the camera 35a is controlled by the operator at the host computer 10a to obtain the visual data required for the relevant scientific purposes. The visual data may be in the nature of individual frames or a continuous stream of frames, together with synchronised sensor data from each of the sensors relevant to the scientific purpose, in each case communicated through the network 00a (including load-bearing umbilical cable 41a, which both carries physical load and provides the network extension function—as described in relation to network extension arrangement 40 in FIG. 1), thereby allowing the data to be processed and recorded in the host computer 10a & camera 35a (as relevant) and later retrieved & further analysed, for example, as part of a longitudinal environmental monitoring programme.

On the basis of the monitoring program objective, the operator on board the boat may determine and control various characteristics of the visual images produced using the Drop Camera, such as size and resolution of image. This is accomplished through the selection of camera lens (in advance) and remote control of the height above the floor and all relevant camera settings during operation. The floor area covered by each image may vary typically in the range of 1 $m^2$ to 20 $m^2$ and the number and spacing of images is significantly dependent on the particular monitoring program objective.

Figure 2A:
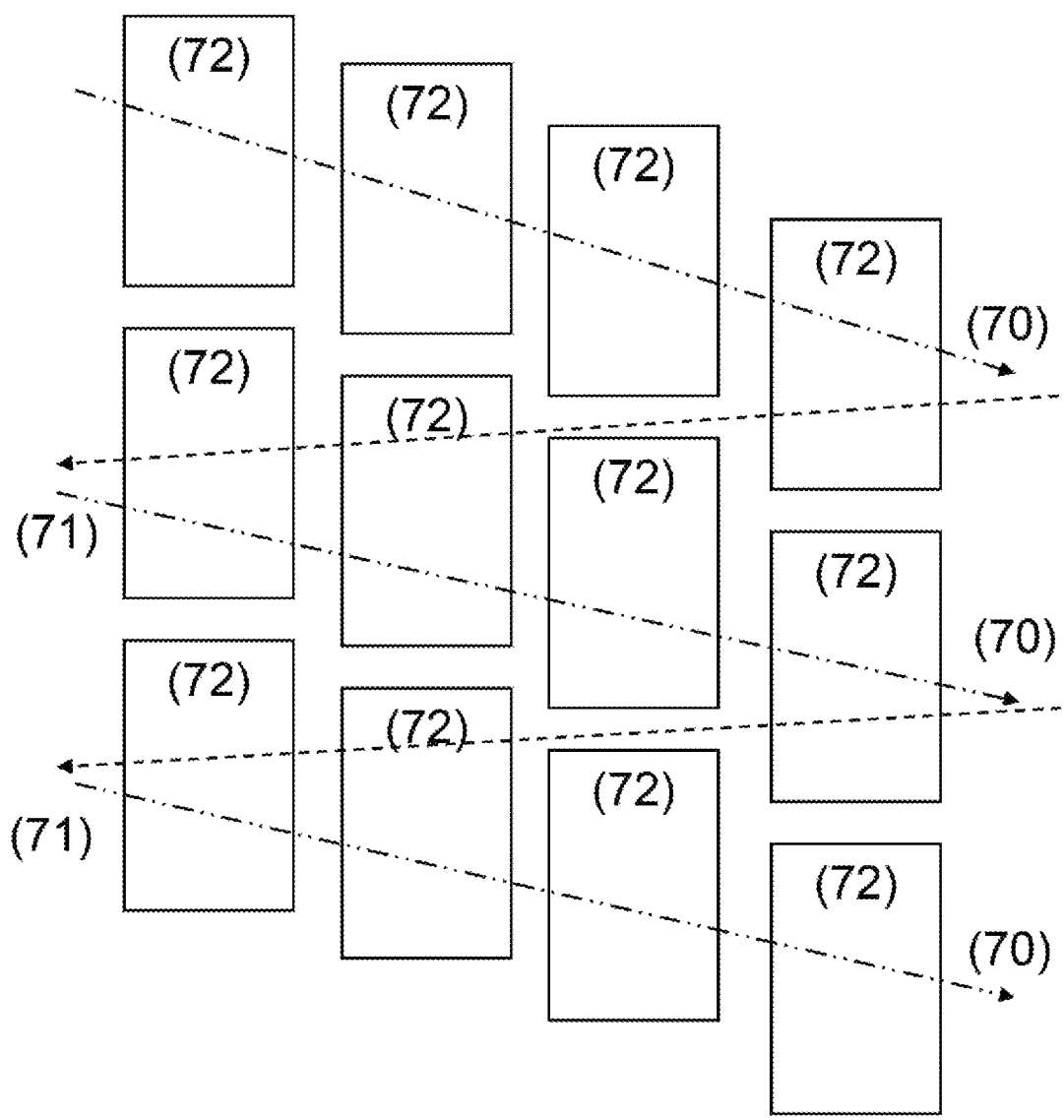
FIG. 2a is an illustrative diagram of a typical series of Drop Camera traverses over a sampling site.

Referring to FIG. 2a (illustrative only), the Drop Camera is typically operated from a boat moving slowly making a series of traverses 70 across a sampling site, with the direction of traverse influenced by conditions such as wind, currents and swell, as well as the boat's propulsion as required and successive visual images 72 of the habitat are taken. At the end of a traverse, the boat returns along a suitable return route 71 to start the next traverse.

Figure 3:
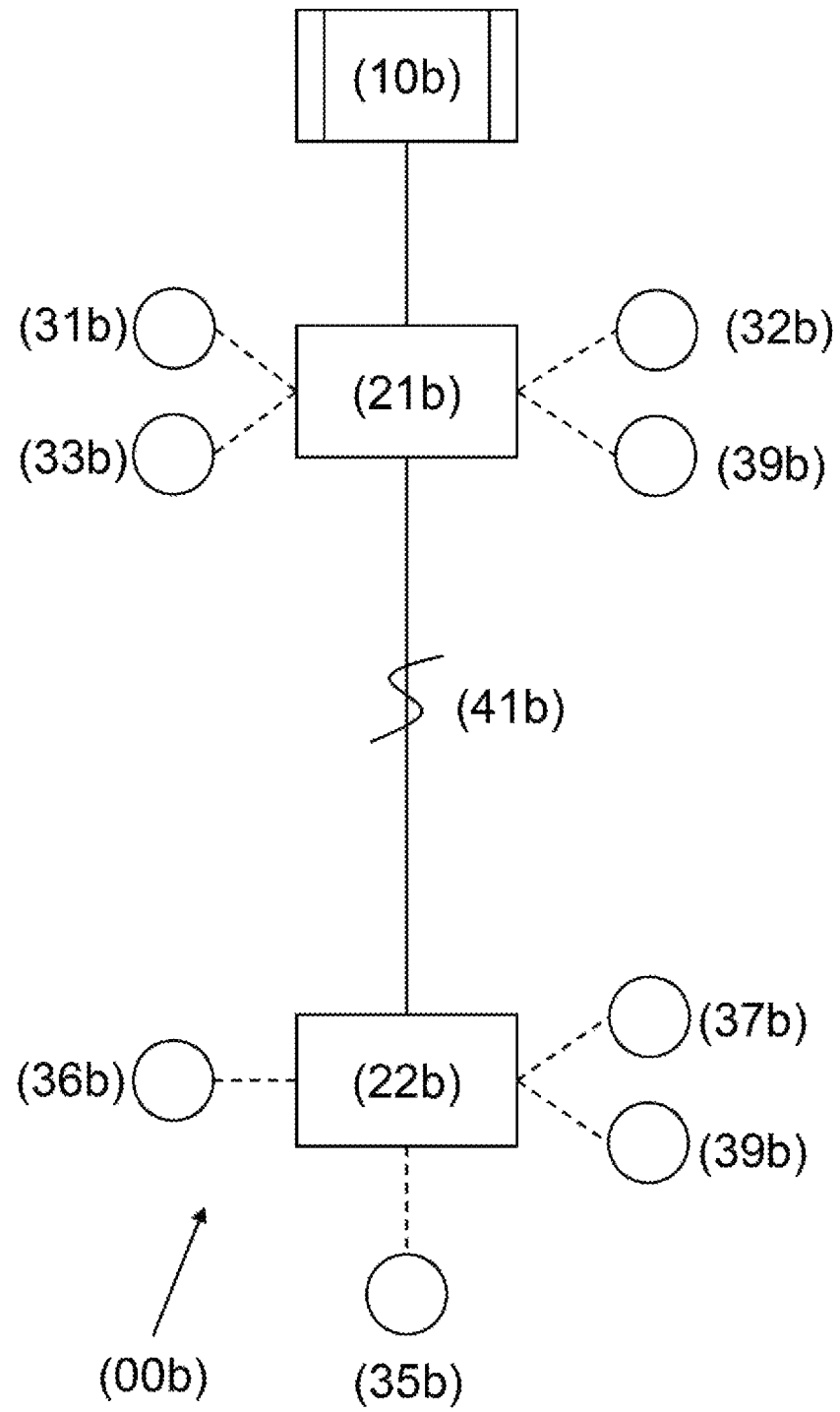
FIG. 3 is a schematic block diagram representation of a second embodiment of the present invention incorporating a Towed Camera as previously described.

Referring now to FIG. 3, a second embodiment of the present invention, that is, a system incorporating a Towed Camera typically for use on a moving boat deployed in relevant aquatic environments, similarly comprises a number of interconnected elements; that is, an on-board powered hub 21b, underwater powered hub 22b and various sensors 31b, 32b, 33b, 35b, 36b & 37b, connected to a host computer 10b (which may be a standard desktop or portable computer), on-board powered hub 21b and host computer 10b together being referred to as deck unit. In addition, this second embodiment includes load-bearing cable compass/tilt sensor 39b mounted on or adjacent to load-bearing cable 41b (similar to that described as load-bearing umbilical cable 41a in FIG. 2) towed by the boat and attached to the camera 35b waterproof casing (similar to that described as casing 80c in FIG. 4). This load-bearing cable compass/tilt sensor 39b (that may be mounted close to the camera 35b and connected to underwater powered hub 22b or, as alternatively shown in FIG. 3, close to the boat and connected to on-board powered hub 21b) senses the bearing & attitude (or tilt) of the load-bearing cable and, when used in conjunction with data from depth sounder 31b & image altimeter 37b, allows the relative position of the camera 35b & the moving boat to be derived by trigonometric computation.

These interconnected elements in FIG. 3 form a network 00b which has characteristics similar & equivalent to those described in relation to FIG. 1 and in relation to FIG. 2, and which is able to communicate required control signals and a stream of synchronised visual data & sensor data to the host computer 10b.

On the basis of the monitoring program objective, the operator on board the boat may determine and control various characteristics of the visual images produced using the Towed Camera, such as size and resolution of images. This is accomplished through the selection of camera lens (in advance) and remote control of the height above the floor, the angle of the camera to the floor and all relevant camera settings during operation. The floor area covered by each image may vary typically in the range of 1.5 m² to 30 m² and the number and spacing of images is significantly dependent on the type of camera in use and on the particular monitoring program objective.

Referring now to the semi-schematic diagram shown as FIG. 4, the first embodiment of the system (that is, the one which incorporates a Drop Camera) may comprise (in physical form):

on-board powered hub 50*c* connected to host computer 10*c* (which is illustrated as a portable computer but may take other forms) and, mounted to the boat, depth sounder 31*c* and combined GPS, compass & tilt sensor 60*c*;

load-bearing umbilical cable 41*c* (similar to those described as load-bearing umbilical cable 41*a* in FIG. 2 and as load-bearing umbilical cable 41*b* in FIG. 3) which, as well as enabling the communications network over distances up to hundreds of metres, if required, between on-board powered hub 50*c* and an underwater powered hub located within casing 80*c* (thereby enabling communication and control between the deck unit, camera and sensors), also carries the physical load between the boat and the frame assembly 90*c* underwater);

casing 80*c*, which provides a waterproof enclosure for the underwater powered hub and, in this first embodiment, a camera (described as camera 130*d* in FIG. 5) to take the visual images of interest;

image altimeter 37*c*; and frame assembly 90*c*, which secures & protects casing 80*c*, allows for the attachment of load-bearing umbilical cable 41*c* and secures anti-flotation weights (described as weights 210*d* in FIG. 5) & image altimeter 37*c*.

It should be noted that the logic and communication functions, as represented in the schematic block diagram in FIG. 2 (and in more generic terms, as represented in the schematic block diagram in FIG. 1), apply equally to this first embodiment as here described in physical form.

Referring now to the 'exploded' view shown as FIG. 5, the casing and frame assembly for the Drop Camera incorporated in the first embodiment of the system may include without limitation:

body 100*d*, latches 105*d*, O-rings 120*d*, cover 140*d* and dome 150*d* which, together with various sealed input/output connections, form a waterproof casing;

camera docking station 110*d*, which incorporates batteries & associated circuitry, network interface extension circuitry module, mounting bracket for camera 130*d* and connector(s) for additional SD or other digital memory card(s);

camera 130*d*;

dome 150*d*, which is optically clear to allow camera 130*d* to receive clear visual images of the environment external to the casing;

frame members 160*d* and frame end connectors 170*d*, which fit together and are secured by set screws;

mounting bracket 180*d*, which slides longitudinally (and can be locked in position) within slots in frame members 160*d* to facilitate access to the casing before & after deployment, and to which the body 100*d* is attached by means of set screws;

shackles 190*d*, to which the load-bearing cable (described as load-bearing umbilical cable 41*c* in FIG. 4) is attached at its lower end; and weights 210*d*, which counteract the flotation buoyancy of the Drop Camera, attached to the frame members 160*d* by means of weight brackets 200*d*.

The invention claimed is:

1. A system for monitoring benthic habitats from a manned boat, the system comprising:
    an underwater camera assembly having an underwater hub connected to a camera to provide visual images of the benthic habitat:
    one or more sensors mounted on the underwater camera assembly and connected to the underwater hub, wherein the one or more sensors include an image altimeter;
    a deck unit having an onboard hub operatively connected to one or more underwater hubs forming an extensible network with the camera and one or more underwater sensors to enable "plug-and-play" configuration in real time, and communication with and control of the camera and sensors by an operator on the boat to facilitate the capture of a sequence of operator-selected visual images simultaneous to and correlated in time and location with sensor data wherein successive images in a sequence are of spatially separate locations within a habitat; and
    a processor connected to the onboard hub for processing the images from the camera and the sensor data from the one or more sensors connected to the extensible network to provide statistically valid qualitative and quantitative assessment of the benthic habitats on a significant spatial scale.

2. The system according to claim 1, comprising an umbilical (which may be load-bearing) providing a connection between the deck unit, camera and sensors and wherein a part of the extensible network is carried in the umbilical thereby enabling operative communication, logic connection and control and connection of additional sensors (directly or indirectly by interconnecting or chaining hubs) over extended distances without changes to the umbilical itself and in a manner which is equivalent to a direct attachment of a sensor to a computer hosting the processor.

3. The system according to claim 2, wherein the umbilical, camera and sensors are arranged to operate at depths up to 300 meters.

4. The system according to claim 2, wherein the umbilical, camera and sensors are arranged to operate at depths up to 100 meters.

5. The system according to claim 2, wherein the umbilical, camera and sensors are arranged to operate at depths up to 60 meters.

6. The system according to claim 1, further comprising a camera docking station arranged so as to provide power to one or more of the camera, the extensible network and one or more sensors.

7. The system according to claim 1, further comprising an onboard GPS unit connected to the deck unit providing boat location at the time of data capture.

8. The system according to claim 7, further comprising:
    an umbilical load bearing cable connecting the underwater camera assembly to the manned boat;
    a depth sounder connected to the onboard hub, and a compass/tilt unit cooperating with the extensible network to sense the bearing and attitude of the umbilical load-bearing cable;

wherein the compass/tilt unit which in conjunction with data from the GPS unit, the depth sounder and the image altimeter, allows the relative position of the camera to be derived by the processor.

9. A method for acquiring a statistically valid qualitative and quantitative assessment of a benthic habitat over a significant spatial scale comprising:

deploying from a moving manned boat an underwater camera assembly having an underwater hub, a camera and one or more sensors mounted on the camera assembly, wherein the one or more sensors include an image altimeter;

operatively connecting a deck unit, using an umbilical to the camera and the one or more sensors via the underwater hub creating an extensible network to enable communication and control between the deck unit, and the camera and the one or more sensors, operating the camera using the deck unit to facilitate the simultaneous capture of a sequence of operator-selected visual images of the benthic habitat and correlated sensor data wherein successive images in a sequence are of spatially separate locations within a benthic habitat; and processing the images and sensor data collected by means of the extensible network to provide statistically valid qualitative and quantitative assessment of the benthic habitat on a significant spatial scale.

10. The method according to claim 9, comprising connecting the deck unit to the camera by an umbilical and wherein the extensible network is arranged to enable connection of additional sensors over extended distances without changes to the umbilical itself and in a manner which is equivalent to a direct attachment of a sensor to the computer hosting the processor.

11. The method according to claim 9, further comprising:

connecting the underwater camera assembly to the manned boat using an umbilical load bearing cable;

sensing water depth with a depth sounder connected to the onboard hub, sensing the bearing and attitude of the umbilical load-beating cable with a compass/tilt unit cooperating with the extensible network; and deriving the relative position of the camera using a compass ;tilt unit in conjunction with data from a GPS unit, the depth sounder and the image altimeter.

* * * * *

UNITED STATES PATENT AND TRADEMARK OFFICE
CERTIFICATE OF CORRECTION

PATENT NO. : 10,649,316 B2  
APPLICATION NO. : 15/557110  
DATED : May 12, 2020  
INVENTOR(S) : Matthew Harvey et al.

Page 1 of 1

It is certified that error appears in the above-identified patent and that said Letters Patent is hereby corrected as shown below:

In the Claims

Column 10, Lines 21-22, Claim 11:  
After "relative position of the camera using a"  
Delete "compass ; tilt unit" and  
Insert -- compass / tilt unit --

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*